United States Patent [19]
Karlsson et al.

[11] Patent Number: 5,619,401
[45] Date of Patent: Apr. 8, 1997

[54] CIRCUIT ARRANGEMENT

[75] Inventors: Bror M. Karlsson, Huddinge; Roland J. E. Wald, Skärholmen, both of Sweden

[73] Assignee: Telefonaktiebolaget LM Ericsson, Stockholm, Sweden

[21] Appl. No.: 460,823

[22] Filed: Jun. 2, 1995

[30] Foreign Application Priority Data

Jun. 2, 1994 [SE] Sweden ................................. 9401902

[51] Int. Cl.$^6$ ............................................. H02M 3/335
[52] U.S. Cl. ............................................. 363/17
[58] Field of Search ........................... 363/98, 131–132, 363/55–58, 17–21

[56] References Cited

U.S. PATENT DOCUMENTS

| | | | |
|---|---|---|---|
| 4,217,632 | 8/1980 | Bardos et al. | 363/26 |
| 4,802,078 | 1/1989 | Hill | 363/56 |
| 5,172,308 | 12/1992 | Tohya | 363/56 |
| 5,198,969 | 3/1993 | Redl et al. | 363/17 |

OTHER PUBLICATIONS

Bill Andreycak, "Unitrode Integrated Circuits", *Phase Shifted, Zero Voltage Transition Design Considerations and the UC3875 PWM Controller*, pp. 9–393 to 9–406.

*Primary Examiner*—Aditya Krishnan
*Attorney, Agent, or Firm*—Burns, Doane, Swecker & Mathis

[57] ABSTRACT

The invention comprises a circuit arrangement with a first direct voltage to an alternating voltage transforming unit, an alternating voltage to a second direct voltage transforming unit, and a second direct voltage smoothing filter, connectable to a load, whereby the first direct voltage to an alternating voltage transforming unit has an inductance whose one connection is connected to a mutual connecting point for a two series connected rectifiers, and wherein the alternating voltage to a second direct voltage transforming unit includes a parallel related rectifier. A back current through one of two parallel related rectifiers, formed at the switching period of the alternating voltage, and a therefrom originating power contribution to the inductance, is redistributed by a power contribution redistributing organ, belonging to the transforming unit, in order to reduce the losses appearing, for instance in the series connected rectifiers.

20 Claims, 3 Drawing Sheets

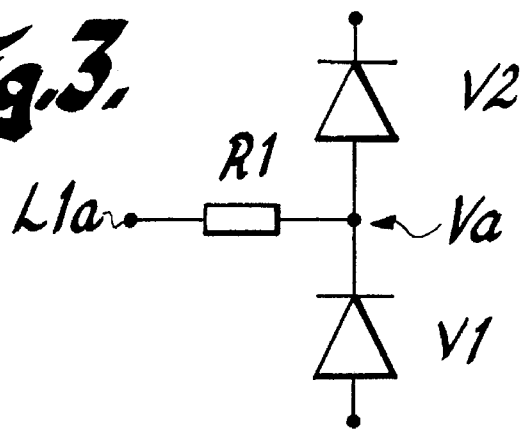
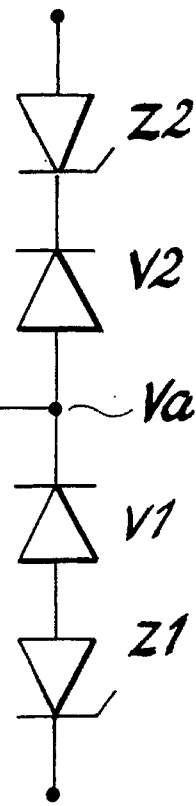
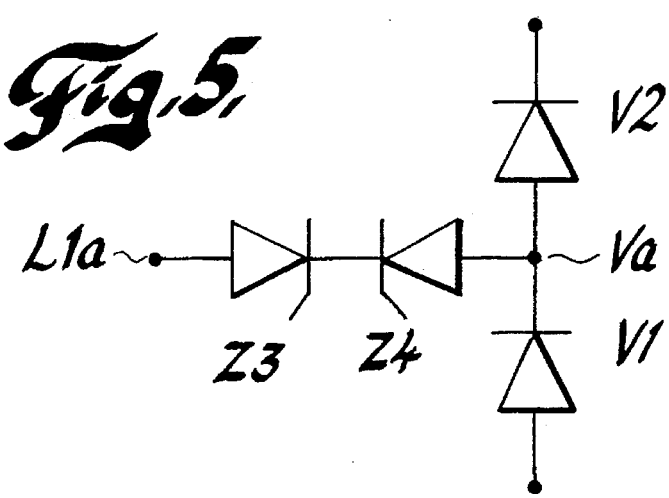
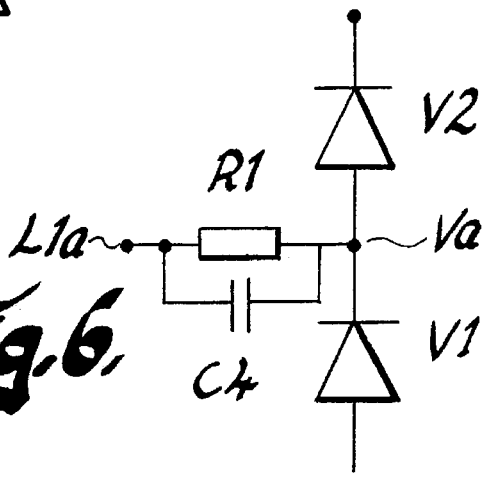

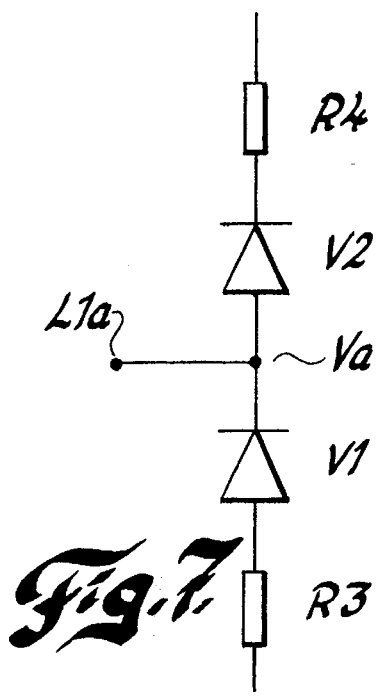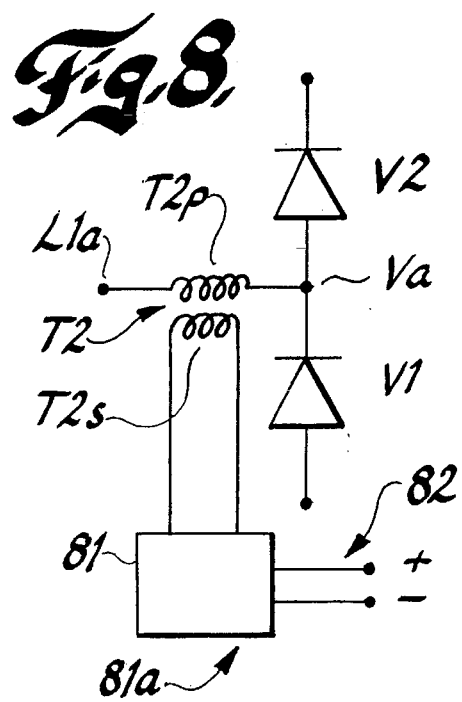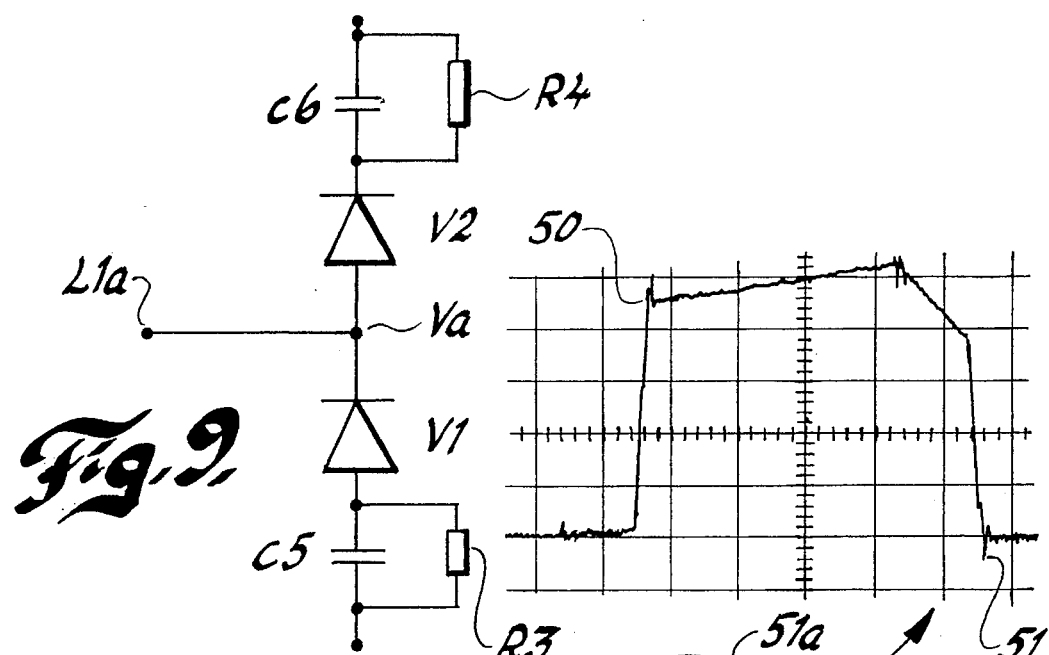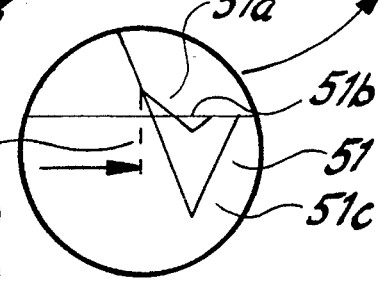

CIRCUIT ARRANGEMENT

BACKGROUND

The present invention relates generally to an electrical circuit arrangement, adapted to be able to generate a constant direct voltage.

In particular the circuit arrangement generates a constant direct voltage even when the power take-off, and thereby the direct current connectable to a load, is allowed to vary within predetermined limits.

Circuit arrangements of this kind usually use; a transforming unit, intended to transform a first direct voltage into a first alternating voltage with a normally trapezoidal shape; a so called inverter or inverted rectifier; a transforming unit, intended to transform a second alternating voltage into a second direct voltage; and a smoothing filter, intended to smooth the second direct voltage, whose output terminals are connectable to a circuit external power consuming load.

Circuit arrangements of this kind are often called Direct Current to Direct Current (DC-DC) converters.

DC-DC converting circuit arrangements, such as the one described above, are previously known through several various embodiments.

They are adapted to keep their direct voltage constant, regardless of any change in the conditions of a connected load, or load circuit, through a regulation based on a pulse width modulation or a phase regulation. The present invention is mainly adaptable with a phase regulation.

Several regulating circuits of this kind are previously known in various embodiments. One example of related art is found in the publication "Product & Application Handbook 1993–1994", published by "Unitrode Integrated Circuits" with an article entitled "Phase Shifted, Zero Voltage Transition Design Considerations and the UC3875 PWM Controller", by Bill Andreycak, pages 9-393 to 9-406.

Taking the significant characteristics of the present invention into consideration, it can also be mentioned that a similar DC-DC converting arrangement as described above, was previously made known through the U.S. Pat. No. 5,198,969. In that arrangement a first direct voltage to a first alternating voltage transforming unit presents an inductance "Lc", through which passes; a load current through a connected load; and a back current, generating a loss of power. One of its connections is directly connected to a mutual connection of two rectifying diodes "$D_5$, $D_6$", connected in series. The other connecting points of the diodes are connected to required positive and negative voltage.

Said publication is regarded as the closest circuit arrangement to the present invention.

Taking the significant characteristics of the present invention under further consideration it can also be mentioned that the U.S. Pat. No. 4,217,632 describes inductances (42, 43) that can be saturated, within a second alternating voltage to a second direct voltage transforming unit. However that circuit construction is different from that of the present invention.

The content of the U.S. Pat. No. 4,802,078 is also considered related art. This publication shows and describes an AC-DC converter that is based on a halfbridge rectifier.

The diodes (50, 54) used in this arrangement are meant to protect two transistors (52, 56) that do not endure back currents.

The function of the resistances (46, 48) is to consume the contributed power, which is generated at the secondary side (4) of the transformer ("A") and appears on the primary side (2) of the same.

The purpose of this "snubber"-circuit is to connect the resistances (46 and 48 respectively) in parallel over the primary winding of the transformer ("A") through the transistors (52 and 56).

They will only be connected during the switching period of the voltage. Thus a resistance is only connected in parallel over said primary the during the short period of time that a power contribution appears on the primary side of the transistor ("A"), and can therefore consume said contributed power.

The other diodes (31 and 33) are not connected in series with any resistance.

Finally, with respect to the DC-DC converter, the content of U.S. Pat. No. 5,172,308 is also considered as related art.

Considering the related art, as described above, it ought to be seen as a technical problem to be able to indicate a DC-DC converter, that can reduce the amount of power that is lost during each switching period, specifically the power losses that occur during and around the actual switching period within two diodes and used transistors, comprised in a first direct voltage to a first alternating voltage transforming unit.

It also ought be regarded as a technical problem to be able to find the right means of connection required to reduce the dimensions of the diodes $D_5$, $D_6$, used in U.S. Pat. No. 5,198,969, thereby reducing the power losses that occur during and around the switching period.

It must also be considered as a technical problem to be able to indicate a circuit arrangement that can provide a current, through the used transistors Q1, Q2, Q3 and Q4, that corresponds, or very nearly corresponds, to the current that passes through the load.

Yet another technical problem is to be able to realize that this kind of power loss can be reduced with a DC-DC converter with phase regulation, by including a power distributing, or power loss distributing, organ within said, a first direct voltage to a first alternating voltage, transforming unit.

It ought to be regarded as a technical problem to be able to realize where to include, or connect, said power loss distributing organ in the circuit arrangement and to thereto be able to realize that said organ is to be able to continually eliminate the power that is to be redistributed.

It must also be regarded as a technical problem to be able to indicate an organ of this kind with a simple technical connecting construction.

It must also be regarded as a technical problem to be able to indicate an organ that consists solely of a mean that presents resistive properties, such as a resistance.

It is, besides this, a technical problem to dimension the resistance value of said resistance, so that each occurrence of power loss has sufficient time to fade out without generating excessively high voltage spikes across diodes that belong to an output circuit.

It is also a technical problem to, in relation to related art, be able to achieve said redistribution with a significantly reduced loss of power in relation to the reduction of power losses that is provided by the circuit arrangement described in U.S. Pat. No. 5,198,969.

It must also be regarded as a technical problem to be able to realize the importance of being able to reduce the back currents through the diodes in the output circuit, named output diodes, or occurring back currents through the rectifying means of the second alternating voltage to a second direct voltage transforming circuit in order to achieve a power-lean DC-DC conversion.

It ought to be a technical problem to be able to realize the importance of that a well-adapted reduction of a back current preferably can be achieved by means of an inductance that can be saturated, where each of two such inductances is dimensioned to limit the back currents through the adjacent rectifying mean, through a high inductance value, but appear as transparent to forward currents, through the same rectifying mean, by letting the inductance go into saturation.

It also ought to be regarded as a technical problem to be able to consider alternative arrangements for the small back currents that are bound to occur, in order to create a power redistribution.

It then ought to be regarded as a technical problem to be able to realize the importance of considering and taking care of that such a small back current will charge said inductance, or help inductance, with a current spike of short time duration, said inductance belonging to a first direct voltage to a first alternating voltage converting unit with at least the load current through a connected load, but also with a minor back current, passing through it.

It must besides this be regarded as a technical problem to be able to realize the importance of that the loss related power, which is stored within said help inductance, must be distributed, and to indicate the use of an organ with resistive properties, such as a resistance, or other more or less equivalent connecting arrangements, for this purpose.

It must also be regarded as a technical problem to be able to show how to reduce the losses, taking the connecting arrangement, illustrated in U.S. Pat. No. 5,198,969, into consideration, where the stored power within the help inductance is lead away through two diodes ($D_5$, $D_6$) and to besides this taking into consideration that the showed help inductance ($L_c$) provides a very low voltage to demagnetize towards, which in practice means that it will not have sufficient time to demagnetize during the switching period at hand, which in turn means that the demagnetizing power may only be consumed through available transistors and diodes.

It is then a technical problem to, with a circuit arrangement of the kind that previously has been described, be able to realize the importance of connecting, directly or indirectly, between one of two connections that belong to the inductance and a connecting point; an organ that presents resistive, or at least essentially resistive, properties, such as a resistance whose resistance value is to be adapted to a relatively short passage, in time, of current through said resistance; one of two series-connected rectifying means; one transistor; and said inductance, without, because of this, allowing a voltage that occurs over a rectifying mean or output diode, that belongs to a second alternating voltage to a second direct voltage transforming unit, to exceed a predetermined value.

It is thus a technical problem to be able to realize the importance of dimensioning the resistance with a value that is high enough to let the help inductance demagnetize relatively fast, without selecting a resistance value that is so high so that the back voltage across the output diode during the switching period is too high.

There is also a technical problem in being able to realize the importance of, and the measures and circuit related dimensioning that is needed to, be able to distribute a certain part of the power that passes through the transistors from the transistors to said resistive-properties-presenting organ.

It must also be regarded as a technical problem to be able to realize the importance and the advantages of permitting a second alternating voltage to a second direct voltage transforming unit to comprise a first inductance, connected between a first rectifying mean that belongs to the unit and the secondary winding of the transformer that belongs to the transforming unit, and a second inductance, connected between a second rectifying mean that belongs to the unit and the secondary winding of the transformer that belongs to the transforming unit and to thereby realize the importance of dimensioning the inductances to be able to limit the back currents through said rectifying mean, through a high inductance value, but appear as transparent to forward currents, through the same rectifying mean, by permitting the inductance to go into saturation.

SUMMARY

With the intention of solving one or more of the above stated technical problems the present invention is based on an already-known circuit arrangement that has a first direct voltage into a pulse shaped alternating voltage transforming unit, an alternating voltage into a second direct voltage transforming unit, and a varying direct voltage value of said second voltage smoothing filter, connectable to a power demanding load, preferably a load that can vary with time.

The present invention is more specifically based on a circuit arrangement whose first direct voltage to an alternating voltage transforming unit presents an inductance, a so called help inductance, whose one connection is connected to a mutual connecting point of two series-connected rectifying means, with a load current and a power loss generating current passing through it, said load current being the current that is passing through a connected load.

In addition in the present invention the alternating voltage to a second direct voltage transforming unit comprises parallel related rectifying means.

Further the invention is based on an already-known circuit arrangement with a back current through one of two parallel related rectifying means formed at the switching period of the alternating voltage.

The invention indicates specifically that a power contribution to said inductance, which originates from these back currents, is redistributed by a power contribution redistributing organ of the transforming unit, in order to reduce the losses that occur, for instance, in the series-connected rectifying means whereby the power contribution redistributing organ comprises both series-connected rectifying means and a resistance or likewise.

As proposed embodiments, falling within the scope of the inventive thought, it is indicated that the power contribution redistributing organ consists of a resistance, or likewise, and two series-connected rectifying means and that the resistance is connected between one connection of the inductance and a mutual connecting point of the two rectifying means.

It is further indicated that the power contribution redistributing organ consists of two series-connected rectifying means and two Zener-diodes, each Zener-diode being counter connected in series with one of the rectifying means, and one connection of the inductance being directly connected to the mutual connecting point of the two rectifying means.

The power contribution redistributing organ (A) can also consist of two series connected rectifying means and two Zener-diodes, each Zener-diode being connected in series and counter connected to one another between one connection of the inductance and the mutual connecting point of the rectifying means.

It is further indicated that the resistance can be connected in parallel with a capacitance.

One embodiment indicates further an organ that consists of two series connected rectifying means and two resistances, each resistance being connected in series with one of the rectifying means.

It is further indicated that said power contribution redistributing organ can consist of two series connected rectifying means, and the primary winding of a transformer, the primary winding being connected between one connection of the inductance and the mutual connecting point of the rectifying means.

It is thereto indicated that the secondary winding of the transformer can be connected to a rectifying organ.

The invention also indicates that the rectifying organ can be arranged to generate a half-wave rectified voltage, which is connected to the second direct voltage.

It is further indicated that the alternating voltage can be seen as two alternating voltages, a first and a second alternating voltage, galvanically separated from each other. The first alternating voltage is connected to a transforming unit and thereby transformed into the second alternating voltage. The voltage value of the first alternating voltage is selected to be higher that the voltage value of the second alternating voltage.

In addition it is indicated that the power contribution redistributing organ is adapted to redistribute the power contribution in order to reduce losses that occur in the components within the, a first direct voltage into an alternating voltage, transforming unit. The components consist of transistors.

In this circuit arrangement it is further indicated that the power losses that develop during the switching period within one of the two series connected rectifying means and within a selected number of transistors, being a part of the first direct voltage to a first alternating voltage transforming unit, are redistributed by said organ.

The proposed embodiments, within the scope of the present invention, further indicate that the power contribution redistributing organ partly consist of an organ that presents resistive, or at least essentially resistive, properties, and that the resistive value of the organ is specifically adapted to the components within the circuit arrangement, in order to provide a current passage through, amongst other things, one of the two series connected rectifying means; one transistor; and the inductance, of a relatively short time duration, without allowing a back voltage across parallel connected rectifying means or output diodes, belonging to the second alternating voltage to a second direct voltage transforming circuit, to exceed a predetermined value.

Further the present invention indicates that a second alternating voltage to a second direct voltage transforming unit comprises a first inductance, connected in series with a first rectifying mean that belongs to the unit, and a second inductance, connected in series with a second rectifying mean that belongs to the unit.

It is further indicated that both of the used inductances are dimensioned to limit back currents through adjacent rectifying means, by means of a high impedance value and to appear as transparent to forward currents through the same rectifying means, by means of saturation.

The primary advantages of a circuit arrangement, according to the present invention, is that by simple means conditions are created redistribute power contributions to a charged help inductance, which is generated and transferred by back currents, so that the power that is stored within the help inductance can be taken care of, not only by transistors and diodes, but also by the power distributing organ, so that a desired demagnetization can be performed in a short time, but not so fast that a back voltage across a rectifying mean or an output diode, that belongs to a second alternating voltage to a second direct voltage transforming unit exceeds a predetermined value.

The primary characteristic features of a circuit arrangement, according to the present invention, are set forth in the characterizing clause of the following Claim 1.

BRIEF DESCRIPTION OF THE DRAWINGS

A few presently proposed circuit arrangements, which depict the significant features of the present invention, will now be described in more detail with reference to the accompanying drawings, in which;

FIG. 3 is a wiring diagram of a first power distributing organ, according to the invention;

FIG. 4 is a wiring diagram of a second embodiment of the organ, according to the invention;

FIG. 5 is a wiring diagram of a third embodiment of the power distributing organ;

FIG. 6 is a wiring diagram of a fourth embodiment of the power distributing organ;

FIG. 7 is a wiring diagram of a fifth embodiment of the power distributing organ;

FIG. 8 is a wiring diagram of a sixth embodiment of the power distributing organ;

FIG. 9 is a wiring diagram of a seventh embodiment of the power distributing organ; and FIG. 10 shows the variations in time of a current through a diode (V3 or V4 according to FIG. 2), with a circuit arrangement according to FIG. 3, and somewhat enlarged the variations in time of the current at one of the switching periods.

DETAILED DESCRIPTION

Figure 1:
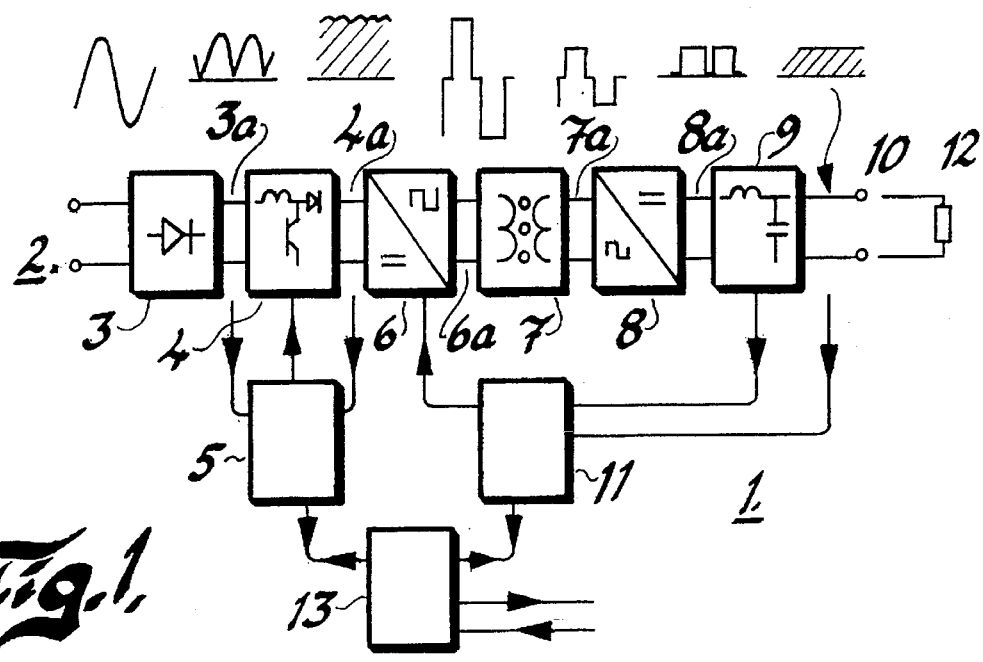
FIG. 1 is a block diagram of an AC-DC converter that belongs to a DC-DC converter, with the voltages that appears between the blocks marked out for simplifying purposes.

With reference to FIG. 1 a block diagram of an AC-DC converter 1 illustrates two connecting conductors that conducts an alternating voltage and an alternating current. The alternating voltage, in a previously known way, forms a fullwave rectified voltage on the conductor 3a through a rectifying bridge 3.

This fullwave rectified voltage reaches a peak value of 375 V and is connected to a "Boost"-converter 4, which consists of a coil, a diode and a transistor, where the state of the transistor is controlled by a control device 5, in a previously known way, to produce a regulated output voltage via on the conductors 4a with a value of 380–400 VDC, having a superposed voltage with a double net frequency (100 Hz or 120 Hz), and a peak-to-peak value in the order of 10 V.

The voltage, through the conductors 4a, and the corresponding current, which will hereafter be denoted as a first direct voltage, is connected to a converting unit 6, through which a pulse width modulation provides a first alternating voltage through the conductor 6a.

Further shown, is a first alternating voltage, that occurs on the conductors 6a, to a second alternating voltage, that occur on the conductors 7a, transforming unit 7.

The DC-DC converter, significant for the invention, uses the blocks 6, 7, 8 and 9, where the transforming unit 7 could be omitted, but is included in order to separate the primary side of the DC-DC converter from the secondary side in a galvanic way.

Said first and second alternating voltages are mutually denoted solely as an alternating voltage, when the transforming unit 7 is omitted.

The transforming unit 7 can be arranged to transform the voltage values either up or down, but can also present a transforming ratio of 1:1.

A second alternating voltage, which occurs on the conductors 7a, to a second direct voltage, which occurs on the conductors 8a, transforming unit 8, is intended to fullwave rectify the second alternating voltage on the conductors 7a. The fullwave rectified pulse shaped direct voltage is connected to a smoothing filter 9, through the conductors 8a.

A direct voltage occurs on the output terminals 10 and fed to a control device 11 at a constant voltage value by means of phase regulation, through previously known circuits. The instantaneous current value can be detected through a detecting connection to the filter 9. The instantaneous value of the current can be adapted to the instantaneous value of the load, through required regulation of the current value, depending on the varying value of the load 12, as the voltage value is kept constant.

A surveying circuit 13 co-acts with the control devices 5 and 11 in a previously known manner.

Figure 2:
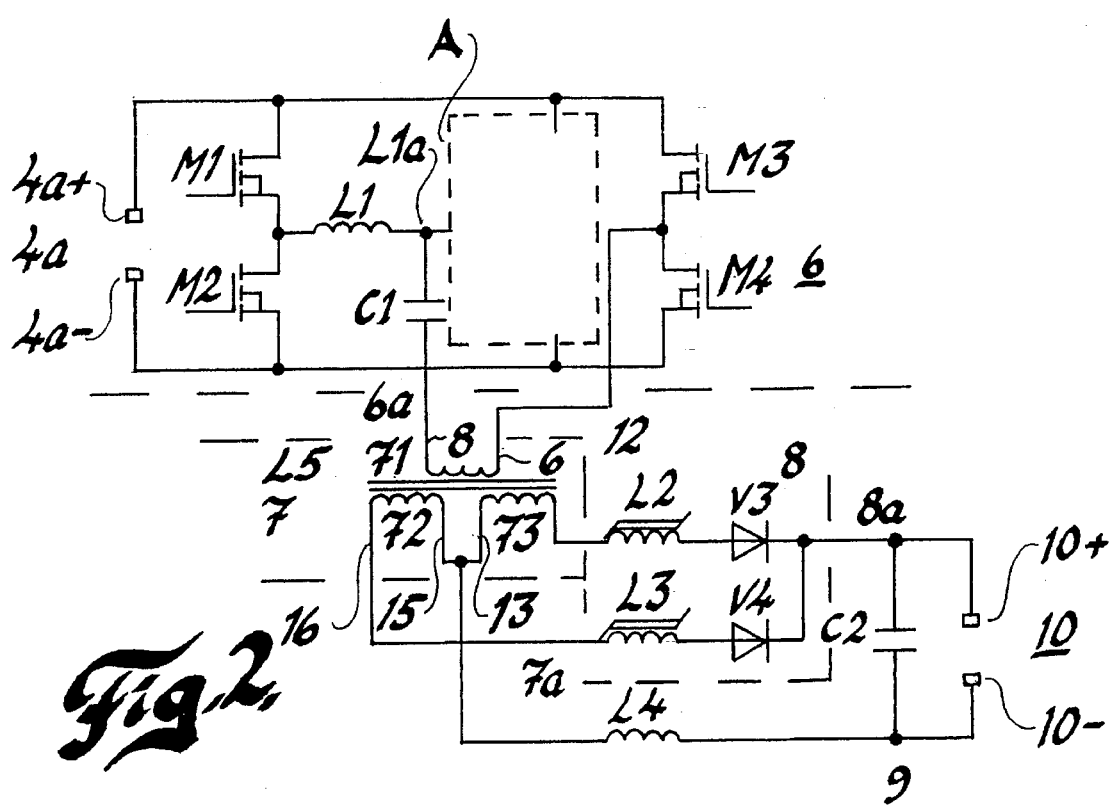
FIG. 2 is a wiring diagram, significant for the invention, of the function blocks that pertain to the invention, with an added power distributing organ.

With reference to FIG. 2, a wiring diagram of a connecting arrangement shows the transforming unit 6, or inverted rectifier 6, the transforming unit 7, or the transformer 7, the converting circuit 8, or the rectifiers 8, and the direct voltage smoothing filter 9, in order to better illustrate the inventive thought of the present invention.

Alternating pulse shaped direct voltage related signals 6a, with an amplitude of approximately 400 VAC, are formed through an active regulation of the transistors M1 and M4, or M2 and M3 alternatively, which belong to the inverted rectifier 6, by means of the control device 11.

In order to understand the present inventive thought it is important to have an understanding of the course of events regarding the energy- or power fluctuations at the switching sequences, the power distribution and the power consumption during the active time periods.

If it is supposed that the transistors M1 and M4 are given an active, or conductive, state it is evident that a load current is fed from the plus-terminal 4a+ through the transistor M1, the help inductance L1, the capacitance C1, the primary winding 71 of the transformer 7, and back through the transistor M4 to the minus terminal 4a−.

Thus the voltage pulse to the transformer 7 is transformed to the secondary winding 72 of the transformer 7 allowing a transformed voltage pulse to pass through an inductance L3 and a diode V4. This pulse is then smoothed through the condenser C2 and the inductance L4 in order to form a current to the plus terminal 10+ of conductor 10.

A voltage pulse in the opposite direction is received at the primary winding 71 during the following switching sequence when transistors M2 and M3 are in a conductive state, and a voltage is transformed to the secondary winding 73 to pass through an inductance L2 and a diode V3 to generate the required current to the plus terminal 10+ of conductor 10.

The present invention is intended, at one hand, to as far as possible limit the back current that appears through one of the diodes (V3 and V4 respectively) during the switching sequences of the transistors M1 to M4.

This can be achieved by using saturable inductances, L1 and L2, which are dimensioned to limit the back currents through the adjacent rectifying mean (V3, V4) through high inductance values, but to appear transparent, by means of saturation, to forward currents through the same rectifying mean.

In spite of measures that have been taken with inductances that can be saturated in the aforesaid manner, it has been proven in the practical application (which is also shown in the time/current course, according to FIG. 10) that a small back current is still generated, and that this back current charges the help inductance L1 with a current spike, illustrated in FIG. 10 with the denotations 50 or 51.

Thus, to redistribute a back-current-originating power contribution, the invention provides a redistributing organ A, which belongings to transforming unit 6, and this organ A is adapted to redistribute and reduce the losses that occur, for instance, in the series-connected rectifying means, of the organ A, and in transistors M1 to M4.

With reference to FIG. 3, it is indicated that organ A consists of a resistance R1 and two series-connected rectifying means V1, V2, and that resistance R1 is connected between one connection L1a of the inductance L1 and the mutual connecting point Va of the two rectifying means V1, V2.

If a redistributing organ A, according to FIG. 3 and applied to a wiring diagram according to FIG. 2, is used it is obvious that the power stored within the inductance L1 can be redistributed during the connecting sequence through resistance R1, by providing a closed circuit, such as through diode V2, the transistor M1, and the inductance L1.

In particular the invention emphasizes the dimensioning of the value of the resistance R1.

At a selected practical application the resistance value can be selected to be approximately 30 ohm.

The selection of the resistance value is, however, very complex, and requires that consideration be given to various parameters.

A very low resistance value, in the above described oscillating circuit (where the resistance R1 is a part), provides a very long time of discharge for the, as a loss, contributed power. A high value of the resistance in the oscillating circuit permits the required power redistribution and consumption to be performed during a much shorter period of time.

This condition forms a basic thesis that the value of resistance R1 is to be selected to be high.

Given this thesis a selected high resistance value, of resistance R1, will increase the back current related voltage spikes across the diodes V3 and V4.

Thus, although the resistance value, of resistance R1, must be high, it must not be so high as to generate a voltage spike that exceeds a predetermined value, which is the value at which the diodes V3 and V4 can be destroyed, taking a suitable safety margin into consideration.

Thus, FIG. 3 illustrates a first embodiment of the power contribution redistributing organ A.

In FIG. 4, a second embodiment of organ A is illustrated. This embodiment consists of two series-connected rectifying means V1, V2 and two Zener-diodes, each Zener-diode being counter connected in series with one of the rectifying means. The connection L1a of the inductance is directly connected to the mutual connecting point Va of the two rectifying means.

FIG. 5 shows that the power contribution redistributing organ A consists of two series-connected rectifying means V1, V2 and two Zener diodes Z3, Z4, where the Zener-diodes in principal can be regarded as being the resistance R1 illustrated in FIG. 3, the Zener diodes being connected in series and counter connected to each other between one connection L1a of the inductance L1 and the mutual connecting point Va of the rectifying means.

FIG. 6 shows a fourth embodiment of an organ A, where resistance R1, according to FIG. 3, is connected in parallel with a capacitance C4.

FIG. 7 shows a fifth embodiment of an organ A, using two series-connected rectifying means V1, V2 and two resistances R3, R4, each resistance being connected in series with one of the rectifying means. One connection L1a of the inductance is directly connected to the mutual connecting point Va of the two rectifying means.

FIG. 8 shows a sixth embodiment of the power contribution redistributing organ A, which consists of two series-connected rectifying means V1, V2 and the primary winding T2p of a transformer, the primary winding being connected between one connection L1a of the inductance L1 and the mutual connecting point Va of the rectifying means.

The secondary winding T2s of the transformer T2 is connected to a rectifying organ 81, and this rectifying organ can be arranged to form a fullwave rectified voltage, in a previously known way, on the connections 82.

The rectifying organ 81 can also comprise a voltage smoothing circuit 81a, in a previously known way. The generated voltage 82 can be directly connected to the load 12 through the connections 10.

The fullwave rectified voltage 82 can then be connected to the voltage-smoothing circuit 9 in FIG. 2, without having to use an internal voltage smoothing circuit.

FIG. 9 shows a seventh embodiment of the organ A, where the organ consists of two series-connected rectifying means V1, V2, two resistances R3, R4, each resistance being connected in series with one of the rectifying means and two capacitances C5, C6, each being connected in parallel with one of the resistance R3, R4. One connection L1a of the inductance is directly connected to the mutual connecting point Va of the two rectifying means.

Although a series connection of a resistance and a diode is illustrated in FIG. 7 and 9, with a mutual connecting point Va of the diodes it is obvious that the diodes and the resistances can change places so that the resistances have a mutual connecting point Va.

The connecting arrangements of the organ A are specifically suitable with phase regulated full bridges, but the connecting arrangement can also be used with half bridges, that work with a constant off-time.

The resistance R1 can be exchanged with a number of other equivalent circuit connections.

One such example is illustrated in FIG. 9. In this figure the condensers C5 and C6 are dimensioned so that the voltages across them are essentially constant. An advantage with this solution is that it insures that the clamping voltage is constant, giving good control of the voltage across the output diodes V3 and V4.

It is also, within the scope of the invention, possible to exchange the condensers C5 and the resistance R3, as well as the condensers C6 and the resistance R4 with Zener-diodes to achieve the same technical effect, which the indicated connecting arrangements are intended to illustrate.

There are several various embodiments and variations of connections of the different elements, all within the scope if the inventive thought, that provide means for transferring parts of the power losses in the transistors and diodes within the inverted rectifier 6 to some other component, while same reducing the total amount of loss.

To connect a power contribution redistributing organ A, according to the present invention, provides, besides this, the possibilities to reduce the risk of a self-oscillating circuit.

The time wise variations of the current through one of the diodes V3 or V4 are shown in FIG. 10. In this example, a circuit arrangement, according to FIG. 3, is used. The time variation at one of the two switching sequences, 50 and 51 respectively, has been somewhat enlarged.

FIG. 10 shows two switching sequences, denoted 50 and 51. The inductance L2 or L3 is in saturation during the current variation up to the point "$t_0$". Thereafter will the current, at the switching moment, has the time wise variation which is illustrated by the curve denoted 51a. The current spike, denoted 51b, generates the loss related contributed power that is to be distributed as previously described.

Supposedly the time variation follows the curve 51c when the saturable inductances L2, L3 have not been used, resulting in a larger loss related power contribution.

The inductance L2 or L3 provides a large inductance value after the time "$t_0$", and thereby limits the back current through the adjacent rectifying mean V3, V4.

The inductances appear transparent to forward currents through the same rectifying means.

It will be understood that the invention is not restricted to the illustrated exemplifying embodiments thereof and that modifications can be made within the scope of the inventive thought illustrated in the following claims.

We claim:

1. A circuit including a first direct voltage to an alternating voltage transforming unit, an alternating voltage to a second direct voltage transforming unit, and a direct voltage smoothing filter, connectable to a load, whereby the first direct voltage to an alternating voltage transforming unit has an inductance that is connected to a mutual point for a two series connected rectifying means, and where the alternating voltage to a second direct voltage transforming unit includes a parallel related rectifying means, whereby a back current through one of two parallel related rectifying means is formed at the switching period of the alternating voltage, the transforming unit further comprising a power contribution redistributing organ for redistributing a power contribution to said inductance originating from said back current to reduce the losses appearing in the series connected rectifying means whereby the organ comprises both of the series connected rectifying means to shorten the duration in time of the back current.

2. The circuit according to claim 1, wherein said power contribution redistributing organ further comprises a resistance and two series connected rectifying means wherein said resistance is connected between one connection of the inductance and a mutual connecting point of said two rectifying means.

3. A circuit including a first direct voltage to an alternating voltage transforming unit, an alternating voltage to a second direct voltage transforming unit, a direct voltage smoothing filter, connectable to a load, whereby the first direct voltage to an alternating voltage transforming unit has an inductance that is connected to a mutual point for a two series connected rectifying means, and where the alternating voltage to a second direct voltage transforming unit includes a parallel related rectifying means, whereby a back current through one of two parallel related rectifying means is formed at the switching period of the alternating voltage, the transforming unit further comprising a power contribution redistributing organ for redistributing a power contribution to said inductance originating from said back current to reduce the losses appearing in the series connected rectifying means whereby the organ comprises both of the series connected rectifying means, and wherein said power contribution redistributing organ further comprises two series connected rectifying means and two Zener-diodes, each Zener-diode counter connected in series with one of said rectifying means wherein one connection of the inductance is directly connected to a mutual connecting point of said two rectifying means.

4. A circuit including a first direct voltage to an alternating voltage transforming unit, an alternating voltage to a second direct voltage transforming unit, a direct voltage smoothing filter, connectable to a load, whereby the first direct voltage to an alternating voltage transforming unit has an inductance that is connected to a mutual point for a two series connected rectifying means, and where the alternating voltage to a second direct voltage transforming unit includes a parallel related rectifying means, whereby a back current through one of two parallel related rectifying means is formed at the switching period of the alternating voltage, the transforming unit further comprising a power contribution redistributing organ for redistributing a power contribution to said inductance originating from said back current to reduce the losses appearing in the series connected rectifying means whereby the organ comprises both of the series connected rectifying means, and wherein said power contribution redistributing organ further comprises two series connected rectifying means and two Zener-diodes, said Zener-diodes connected in series and counter connected to each other between one connection of the inductance and a mutual connecting point of said rectifying means.

5. The circuit according to claim 2, wherein said resistance is connected in parallel with a capacitance.

6. A circuit including a first direct voltage to an alternating voltage transforming unit, an alternating voltage to a second direct voltage transforming unit, a associated direct voltage smoothing filter, connectable to a load, whereby the first direct voltage to an alternating voltage transforming unit has an inductance that is connected to a mutual point for a two series connected rectifying means, and where the alternating voltage to a second direct voltage transforming unit includes a parallel related rectifying means, whereby a back current through one of two parallel related rectifying means is formed at the switching period of the alternating voltage, the transforming unit further comprising a power contribution redistributing organ for redistributing a power contribution to said inductance originating from said back current to reduce the losses appearing in the series connected rectifying means whereby the organ comprises both of the series connected rectifying means, and wherein said power contribution redistributing organ further comprises two series connected rectifying means and two resistances, each resistance connected in series with one of said rectifying means wherein one connection of the inductance is directly connected to a mutual connecting point of said two rectifying means.

7. A circuit including a first direct voltage to an alternating voltage transforming unit, an alternating voltage to a second direct voltage transforming unit, a direct voltage smoothing filter, connectable to a load, whereby the first direct voltage to an alternating voltage transforming unit has an inductance that is connected to a mutual point for a two series connected rectifying means, and where the alternating voltage to a second direct voltage transforming unit includes a parallel related rectifying means, whereby a back current through one of two parallel related rectifying means is formed at the switching period of the alternating voltage, the transforming unit further comprising a power contribution redistributing organ for redistributing a power contribution to said inductance originating from said back current to reduce the losses appearing in the series connected rectifying means whereby the organ comprises both of the series connected rectifying means, and wherein said power contribution redistributing organ further comprises two series connected rectifying means and the primary winding of a transformer, said primary winding connected between one connection of the inductance and a mutual connecting point of said rectifying means.

8. The circuit according to claim 7, wherein the secondary winding of said transformer is connected to a rectifying organ.

9. The circuit according to claim 8, wherein the rectifying organ further comprises a voltage smoothing circuit wherein a generated voltage is connected to the load.

10. The circuit according to claim 8, wherein a voltage generated by the rectifying organ is connected to a voltage smoothing circuit which is preconnected to a load.

11. The circuit according to claim 6, wherein each of said resistances are connected in parallel with a capacitance.

12. The circuit according to claim 1, wherein said alternating voltage is divided into two alternating voltages, a first alternating voltage and second alternating voltage, wherein said first alternating voltage is connected to a transforming unit and thereby transformed into the second alternating voltage.

13. The circuit according to claim 12, wherein the voltage value of the first alternating voltage is selected to be higher than the voltage value of the second alternating voltage.

14. The circuit according to claim 1, wherein said power contribution redistributing organ redistributes the power contribution to reduce losses that occur in the components within the unit transforming a first direct voltage into an alternating voltage.

15. The circuit according to claim 14, wherein said components consists of transistors.

16. The circuit according to claim 1, wherein power losses developed during the switching period within said two rectifying means and within a number of selected transistors, being a part of said, a first direct voltage to an alternating voltage, transforming unit, are redistributed by said organ so that said organ takes a portion of the redistribution of the power losses and that said organ is connected in a way so that the total amount of power losses are reduced.

17. The circuit according to claim 11, wherein the resistive value of said resistive properties presenting organ allows a current passage, through, one of said two series connected rectifying means, one transistor and said inductance, of a relatively short time duration without allowing a voltage across a rectifying mean to exceed a predetermined value.

18. The circuit according to claim 17, wherein the predetermined value of said rectifying mean is selected to be valid for a maximized value multiplied with a predetermined factor selected to be less than 1.0.

19. The circuit according to claim 1, wherein an alternating voltage to a second direct voltage transforming unit comprises a first inductance, connected in series with a first rectifying mean that belongs to the unit, and a second inductance, connected in series with a second rectifying mean that belongs to the unit.

20. The circuit according to claim 19, wherein said inductances are dimensioned to limit back currents through adjacent rectifying means and to appear as transparent to forward currents, by means of saturation.

* * * * *